United States Patent [19]

Miller

[11] 4,185,414

[45] Jan. 29, 1980

[54] FEED REGULATOR FOR NUTRIENT FILM AGRICULTURE SYSTEM

[75] Inventor: William M. Miller, Lafayette, N.Y.

[73] Assignee: General Electric Company, Syracuse, N.Y.

[21] Appl. No.: 848,818

[22] Filed: Nov. 7, 1977

[51] Int. Cl.² .......................... A01G 9/24; A01G 25/16
[52] U.S. Cl. .......................................... 47/62; 47/79; 137/577
[58] Field of Search ............ 47/59, 62, 14, 16, 79–82, 47/48.5, 39; 222/424, 51; 132/574, 391, 395; 239/76, 542; 137/577, 262, 575

[56] References Cited

U.S. PATENT DOCUMENTS

| | | | |
|---|---|---|---|
| 536,716 | 4/1895 | Brentlinger | 222/51 X |
| 1,652,889 | 12/1927 | Cook | 222/424 X |
| 1,921,347 | 8/1933 | Coulson | 222/424 X |
| 2,063,595 | 12/1936 | Feeney | 137/577 |
| 2,152,254 | 3/1939 | Hansen | 47/62 |
| 2,849,835 | 9/1958 | Huff | 47/59 |
| 2,851,198 | 9/1958 | Rasmusson | 222/424 X |
| 2,988,104 | 6/1961 | Stone et al. | 137/262 |
| 3,365,840 | 1/1968 | Cooper | 47/82 |
| 3,584,762 | 12/1968 | Vantroba et al. | 222/1 |
| 3,660,933 | 3/1970 | Wong, Jr. | 47/62 |
| 3,667,157 | 6/1972 | Longhini | 47/59 |
| 3,766,684 | 10/1973 | Kato | 47/62 |
| 3,807,088 | 5/1972 | Jones | 47/62 |
| 3,817,454 | 6/1974 | Pira | 239/76 |
| 3,991,918 | 11/1976 | McNamara et al. | 239/76 X |
| 4,035,950 | 7/1977 | Anslem | 47/59 |
| 4,149,970 | 4/1979 | Atkins et al. | 47/62 X |

FOREIGN PATENT DOCUMENTS

| | | | |
|---|---|---|---|
| 518269 | 3/1953 | Belgium | 47/16 |
| 2640114 | 3/1977 | Fed. Rep. of Germany | 47/62 |
| 2602788 | 7/1977 | Fed. Rep. of Germany | 47/61 |
| 286435 | 6/1931 | Italy | 222/51 |
| 363865 | 10/1938 | Italy | 47/62 |
| 24939 | 10/1936 | United Kingdom | 47/62 |
| 1194153 | 6/1970 | United Kingdom | 47/80 |
| 1245581 | 9/1971 | United Kingdom | 47/62 |
| 1443326 | 7/1976 | United Kingdom | 47/62 |

OTHER PUBLICATIONS

"Rapid Progress Through 1974 With Nutrient Film Trials", Cooper, Jan. 25, 1975, The Grower Magazine.

Primary Examiner—Paul T. Sewell
Assistant Examiner—Steven A. Bratlie
Attorney, Agent, or Firm—Carl W. Baker; Richard V. Lang

[57] ABSTRACT

Nutrient feed regulation systems for automatic control of nutrient flow rates in controlled environment agriculture installations utilizing nutrient film techniques. Such control is provided by feed regulators each including means defining a metering orifice of fixed flow area and means establishing a constant hydrostatic head across the metering orifice, thus enabling the maintenance of a constant nutrient flow rate to all plant growth containers in both vertically tiered and horizontally arrayed container configurations.

6 Claims, 4 Drawing Figures

FEED REGULATOR FOR NUTRIENT FILM AGRICULTURE SYSTEM

BACKGROUND OF THE INVENTION

This invention relates to nutrient supply systems for controlled environment agriculture installations and more particularly to nutrient feed regulation systems providing automatic control of nutrient flow rate to and through the plant growth containers in nutrient film agriculture installations.

The recent development of nutrient film techniques for plant husbandry has opened new opportunities for the production of horticultural crops. Nutrient film techniques differ from the more conventional hydroponic techniques, in which the plant root masses are arranged to be totally immersed in the nutrient solution either constantly or periodically, principally in that in nutrient film agriculture the plant roots are wetted only by contact with a small stream of liquid nutrient. Capillary attraction or wicking then is relied on to extend the nutrient-wetted area over and through the entire root mass. Nutrient supply commonly is accomplished by positioning the plant roots in long troughs or gullies formed of metal, plastic or the like, and flowing a thin stream of liquid nutrient along the bottom of the gulley permitting the stream to contact each of the plant root bundles as it flows along. Nutrient not absorbed by the plant roots drains from an open end of the gulley, which normally is slanted sufficiently to effect a gravity-induced flow of the nutrient along its length. The excess nutrient which drains from the gullies is recycled, usually after any needed replenishment of its compositional elements.

The nutrient stream may desirably be small and the flow rate kept quite low in nutrient film systems, since only enough nutrient is needed to wet the portion of the root mass immediately adjacent to the bottom of the gulley in which the plant is located. Accurate and reliable control of nutrient flow rate is required, however, because if the flow rate becomes inadequate the roots may dry excessively causing damage or even destruction of the plant. This control problem becomes much more difficult where there are a large number of gullies to which nutrient is fed by a common supply system, as will commonly be the case in large installations. In such installations it becomes very difficult to maintain precise equalization of the nutrient feed rates to each of the gullies in the system, yet such equalization is essential if some gullies are not to receive inadequate nutrient supply while others have an excess.

Present nutrient film installations generally depend upon capillary tubes connected between a supply header tube and the individual gullies to regulate the nutrient flow rate to each gulley. Where the header tube is long and feeds a large number of gullies variations in pressure may exist along the header length, and in installations in which the gullies are tiered or otherwise disposed at different heights, differences in hydrostatic pressure of the nutrient supply to the capillary tubes result in considerable variation in nutrient flow rates from gulley to gulley. Capillary tubes may also tend to clog over a period of time, due to deposits of impurities or precipitates from the nutrient solutions in the tubes, and this further aggravates the problem of inequality of nutrient distribution as between the different gullies.

Precision flow regulators of various kinds are commercially available, of course, and could be used in nutrient film agriculture installations. Their initial cost tends to be high, however, and their maintenance costs may likewise be high due to the problem character of the nutrient liquids which they must handle and the large number of regulators required.

The present invention is directed to a nutrient supply system which minimizes these problems common to conventional nutrient film agriculture installations, and which achieves this objective at relatively modest cost both in terms of initial installation expense and in terms of maintenance expense over long use periods.

SUMMARY OF THE INVENTION

The present invention provides a nutrient feed system for nutrient film agriculture installations, particularly for such installations incorporating a plurality of plant growth containers or gullies between which controlled equalization of nutrient supply rates is to be maintained. Preferably the nutrient feed system of the invention includes a feed regulator for each gulley, with each such regulator having within it weir means for establishing and maintaining a fixed hydrostatic pressure determined by the height of the weir and maintained by bypassing the weir overflow. The fixed hydrostatic pressure thus established in each regulator provides the desired independence from variations in pressure in the nutrient supply lines. Flow rate to each gulley is determined by provision of interchangeable metering plugs which are removably mounted in the feed outlets from the regulators into the gullies. With hydostatic head thus held constant, and with a metering orifice of constant cross-sectional area provided by the metering plug, the desired rate of nutrient flow for each gulley can be achieved and maintained with any number of gullies in either horizontally aligned or in vertically or pyramidally tiered configuration. The excess nutrient which overflows the weirs may be ducted to the inlet of the feed regulator of the next lower gulley in vertically or pyramidally tiered systems, or collected and returned to the nutrient supply tank in horizontal gulley configurations. If desired, the feed regulators may incorporate float elements with calibrated rod indicators which provide the operator with a visual check on the state of nutrient flow in the gullies without opening them or disconnecting the feed system.

BRIEF DESCRIPTION OF THE DRAWINGS

The novel and distinctive features of the invention are set forth in the claims appended hereto. The invention itself, however, together with various of its further objects, features and advantages, may best be understood by reference to the following detailed description and the accompanying drawings, in which:

DESCRIPTION OF THE PREFERRED EMBODIMENT

Figure 1:
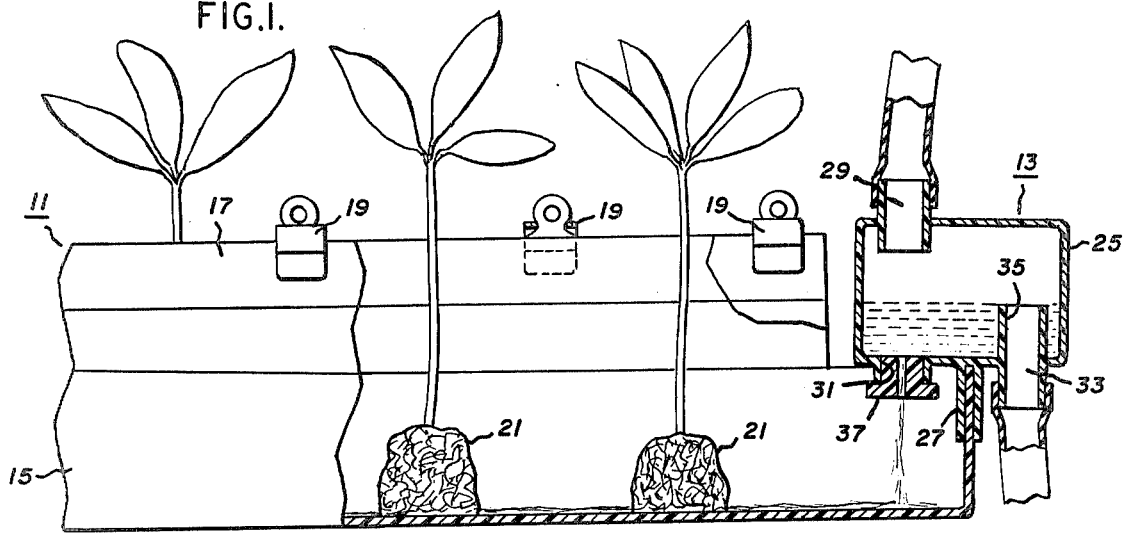
FIG. 1 is a part-sectional view of a nutrient feed regulator in accordance with the present invention, shown mounted to one end portion of a plant growth container.
Figure 2:
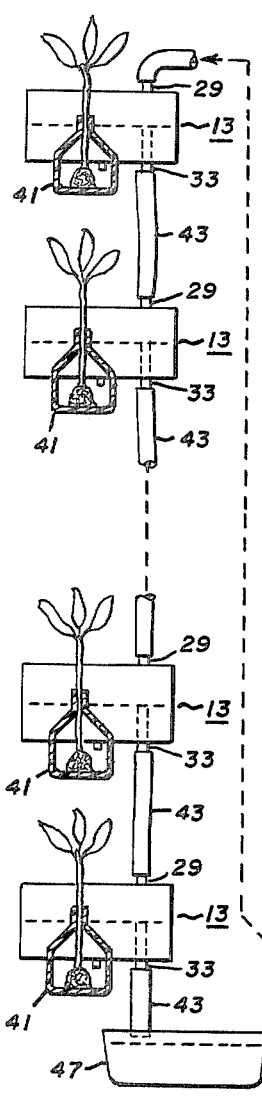
FIG. 2 illustrates a preferred nutrient supply arrangement for use with a plurality of gullies disposed in vertically tiered configuration.

FIG. 1 shows an end portion of a plant growth container or gulley 11 provided with a nutrient feed regulator designated generally by reference numeral 13. Normally a nutrient film agricultural installation will comprise many such gullies arranged in a vertically tiered, pyramidally tiered, or horizontally arrayed configuration, or sometimes in a combination of two or more of these different configurations. The gullies 11 typically are formed of plastic strip material 15 bent to a closed pentagonal-section shape as illustrated in FIGS. 1 and 2, with the upper edges of the plastic being brought together as at 17 and held together by a clip 19 disposed between each adjacent pair of plants. This provides support for the plant stems and also limits the access of light to the gulley interior.

Within the gullies, the plant root masses 21 rest on the gulley bottoms and may be either left bare or held in a rooting block of artificial soil or peat as indicated. Such rooting medium if provided assists in assuring that the entire root mass is wetted with the nutrient, by enhancing the wicking action which draws nutrient upwardly into and through the root mass. The gullies are sloped downwardly as indicated in FIG. 1 to maintain a gravity induced flow within them.

Nutrient film agriculture requires a continuous flow of a small quantity of the nutrient liquid through the gullies and in contact with the root masses. Complete immersion is avoided, as is any period of deprivation of supply of nutrient to the plant roots in the gullies. To provide the carefully regulated nutrient flow to each gulley which these consideration necessitate, the feed regulator 13 comprises a housing 25 which may be formed of molded plastic as described more particularly with reference to FIG. 4. Housing 25 may conveniently be fixed to the gulley end wall as by integrally formed mounting clips 27. The regulator includes a nutrient inlet 29 which connects to the nutrient supply source, a feed outlet 31 and a bypass outlet 33, with these outlets respectivly connecting into the gulley and to a return line or to another regulator in series installations as later described.

Within the housing 25, a weir 35 is formed by upwardly projecting wall means which conveniently may be formed in alignment with the bypass outlet 33 as illustrated. This weir serves to maintain a constant level of liquid within the reservoir defined by housing 25, thus maintaining a constant hydrostatic pressure above the feed outlet 31. This outlet is provided with a metering orifice in the form of an interchangeable apertured plug 37. The fixed cross-sectional area of the plug aperture, in combination with the constant hydrostatic head maintained across the aperture by the fixed level of liquid above, regulates the nutrient flow into the gulley and holds it at essentially a constant rate irrespective of the rate of liquid flow into the housing. The excess overflows the weir 35 and exits through bypass outlet 33 either back to the nutrient supply source or to the feed regulator for another gulley as shown in FIG. 2

Each of the gullies 41 in the vertically tiered array shown in FIG. 2 is provided at one end with a nutrient regulator 13 similar to that shown in FIG. 1. The nutrient feed regulators 13 are connected in a series flow arrangement with the bypass outlet 33 of each regulator connected as by a pipe 43 to the inlet 29 of the nutrient feed regulator for the next lower gulley. Nutrient is supplied, as by a pump shown schematically at 45, to the inlet 29 of the uppermost regulator. Overflow from the bypass outlet of the lowermost regulator is returned to a sump 47 for return to the pump and recycling Replenishment means (not shown) may be provided between the sump and pump to reprocess the nutrient liquid as necessary to maintain its desired chemical composition and to remove any entrained foreign materials.

In operation of the system of FIG. 2, the feed regulator for the uppermost gulley will first fill with nutrient when system operation is initiated; after it has filled its overflow will begin to fill the feed regulator for the next lower gulley, and so on down the line until all the feed regulators are filled and all of the gulleys are being supplied with their individually metered rates of nutrient flow. Such flow rates will remain constant so long as the fluid supply to the system is at least adequate to maintain the level of the liquid in the lowermost feed regulator at a level such that there is some overflow therefrom bypased back to the nutrient source.

Figure 3:
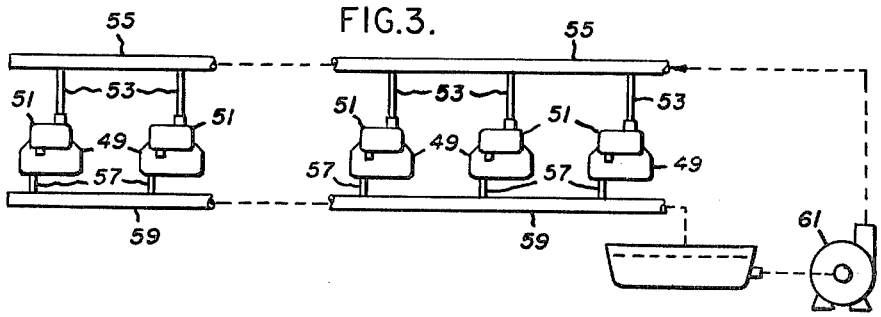
FIG. 3 illustrates a preferred nutrient feed arrangement for use with a plurality of gullies disposed in horizontally arrayed configuration.

As contrasted to the serial flow arrangement of FIG. 2, FIG. 3 illustrates a parallel flow arrangement in which a plurality of plant growth containers or gulleys 49 are arranged in a horizontal array with all the gulleys on essentially the same level. The feed regulator 51 for each of the gullies 49 is supplied through an inlet connection 53 from a header tube 55, and the overflow or return flow from each of the regulators is returned to the nutrient source by a bypass connection 57 to a common sump or return line 59 for recirculation by a pump 61 as described before. In this embodiment the feed regulators initially will all fill simultaneously. Again providing there is at least adequate flow to supply all of the regulators, each will provide a constant metered flow of nutrient liquid to and through its respective gulley irrespective of pressure variations along the length of the supply header.

While the drain ends of the gullies are not shown in FIGS. 2 and 3, it will be understood that whatever nutrient liquid is not absorbed by the plant roots while traversing the length of the gulley into which it is supplied will normally also be returned to the supply source. Such excess drains from the ends of the gullies remote from the feed regulators, and is collected for return to the supply source or sump.

Figure 4:
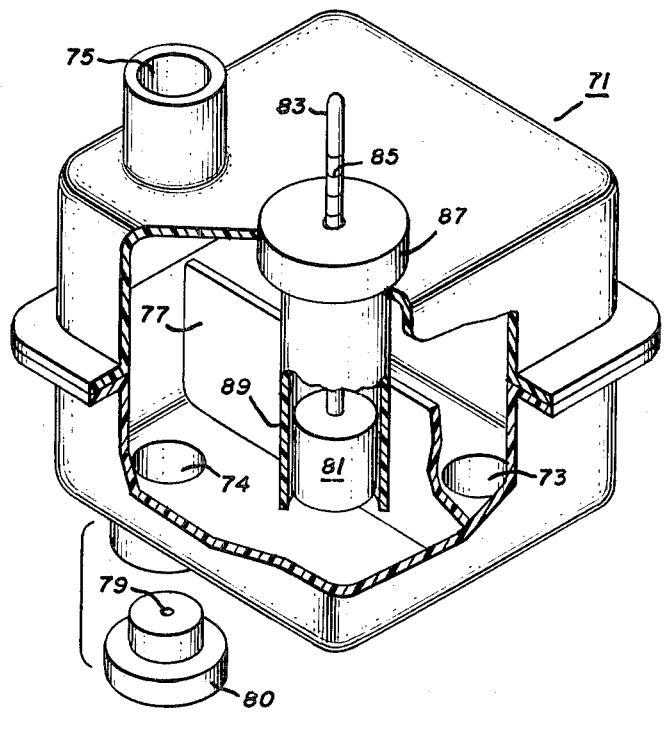
FIG. 4 is a partly sectionalized perspective view, showing in greater detail the nutrient feed regulator of the invention.

Turning now to FIG. 4, a preferred embodiment of feed regulator is illustrated in greater detail. The feed regulator housing 71 may be fabricated as a pair of complementarily formed plastic moldings as shown, with the inlet and the feed and bypass outlets integrally molded into the housing at 75, 74 and 73 respectively. The weir in this embodiment is constituted by a dividing wall 77 of height selected to provide the desired hydrostatic head for the associated metering orifice, which here is defined by the aperture 79 in an interchangeable metering plug 80 adapted to be inserted removably into the feed outlet 74.

Preferably, means are provided for indicating the liquid level within the feed regulator, and as shown in FIG. 4 this indicator comprises a float member 81 having a vertical stem 83 which may be provided with suitable calibration markers as illustrated at 85. This float is mounted to slide vertically within a bearing member 87 mounted in the upper half of the regulator housing 71. The float element may be surrounded by a depending skirt 89 which serves to protect it from any turbulence of the liquid in the housing. In operation, the vertical position of the float rod provides an indication of the level of liquid within the feed reservoir.

These float rod indicators are particularly useful in large systems because they enable the operator to determine at a glance whether the nutrient supply into the system is sufficient to maintain normal operation of the lowermost gulley feed regulators in the case of vertically tiered systems, and to maintain normal operation of the most distantly located of the gulley feed regulators in the case of horizontally arrayed systems. Proper system operation may thus be monitored without opening up the gullies or otherwise disturbing the system. It will be appreciated that these indicators need not be provided for all the feed regulators; they are unnecessry to the feed regulators for the upper gulleys in vertically-tiered systems, for example, since the assurance of an adequate nutrient supply to the lowermost gulley is assurance of the adequacy of supply to all gullies.

As will be obvious to those skilled in the art, apart from the optional float assembly there are no moving or high-precision parts in the nutrient feed regulators of the invention. They are structurally simple and low in first cost, particularly if fabricated of plastic moldings as shown, and require little if any maintenance. Where system sterilization between crop plantings is desired this may be accomplished either by fabricating the regulators of materials capable of withstanding the temperatures involved or by making them disposable, which in view of their low first cost may be a feasible alternative. The metered flow rates to be maintained by the feed regulators of this invention may easily be adjusted as desired by substitution of metering plugs of different orifice sizes, to establish and maintain the particular flow rate desired and also to facilitate correction of any problem caused by clogging of the metering orifices.

Thus the present invention provides a convenient, reliable and low cost device for nutrient flow rate control in nutrient film agriculture installations, capable of accurately and reliably maintaining desired flow rates in such installations whether of vertically tiered, pyramidal or horizontally arrayed configurations.

What is claimed is:
1. A nutrient film agriculture system comprising:
(a) a plurality of elongated and horizontally sloped plant growth containers each accommodating a plurality of plants spaced along its length with the plant roots supplied with liquid nutrient by flow thereof along the bottom of the container in contact with the plant roots;
(b) a plurality of nutrient feed regulators each mounted adjacent the higher end of one of said plant growth containers and each comprising:
(i) housing means defining a nutrient reservoir and further defining a nutrient inlet and nutrient feed and bypass outlets;
(ii) means in said feed outlet defining a metering orifice for controlled flow of nutrient from said reservoir into the adjacent plant growth container in accordance with the metering orifice area and the hydrostatic pressure across said orifice; and
(iii) reservoir level control means comprising a weir disposed between said feed outlet and said bypass outlet for bypassing such quantity of nutrient as necessary to control the reservoir level above said feed outlet;
(c) and means for supplying nutrient liquid to the inlets of all of said feed regulators in quantities such as to produce bypass flow in each of said regulators to thus maintin constant the reservoir level therein and the hydrostatic head established thereby across said metering orifice thereby to maintain a predetermined nutrient flow rate to each of the plant growth containers of the system.

2. A nutrient film agriculture system as defined in claim 1 wherein a plurality of said plant growth containers are disposed on different vertical levels with the inlets and bypass outlets of their respective regulators connected in serial flow relation and with the inlet of the regulator of the uppermost plant growth container being connected to said nutrient supply means.

3. The combination defined in claim 2 further comprising float means disposed within said nutrient reservoir in said housing means of at least the lowermost one of said regulators, said float means including an indicator element visible externally of the housing to provide an indication of nutrient level in the reservoir of said one regulator and thus of nutrient level in the other regulators as well.

4. A nutrient film agriculture system as defined in claim 1 wherein a plurality of said plant growth containers are disposed on a common horizontal level and with the inlets of their respective regulators connected in parallel to said nutrient supply means.

5. The combination defined in claim 4 further comprising float means disposed within said nutrient reservoir in said housing means of at least the one of said regulators most remote from the nutrient supply source, said float means including an indicator element visible externally of the housing to provide an indication of nutrient level in the reservoir of said one regulator and thus of nutrient level in the other regulators as well.

6. In combination in a nutrient film agriculture system including an elongated plant growth container in which the plant roots are spaced along the length of the container and are supplied with liquid nutrient by flow thereof along the bottom of the container in contact with the plant roots, nutrient supply means for providing a regulated flow of nutrient liquid to said plant growth container comprising:
(a) nutrient feed regulator means including housing means defining a nutrient reservoir disposed at a level above the bottom of said plant growth container and having a nutrient inlet and nutrient feed and bypass outlets;
(b) interchangeable metering plug means removably located in said feed outlet defining a single metering orifice for controlling nutrient flow through said feed outlet and into said plant growth container in accordance with the metering orifice area and the hydrostatic head across said orifice;
(c) weir means disposed in said housing means between said feed outlet and said bypass outlet and permitting overflow of liquid within the housing above the level of such weir into said bypass outlet to thus control the level of liquid within the housing means; and
(d) nutrient supply means connected to supply to said inlet a flow of nutrient in excess of that passed by said metering orifice in normal operation of the regulator, whereby the excess flows over said weir means and into said bypass outlet thus maintaining a constant level of liquid in said housing means and a constant hydrostatic head across said orifice means thereby regulating the flow therethrough to the desired constant value.

* * * * *